Jan. 15, 1929.

H. WEICHSEL 1,698,976

ALTERNATING CURRENT DYNAMO ELECTRIC MACHINE

Filed Nov. 2, 1925

INVENTOR
Hans Weichsel
BY E. E. Huffman
ATTORNEY

Patented Jan. 15, 1929.

1,698,976

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

ALTERNATING-CURRENT DYNAMO-ELECTRIC MACHINE.

Application filed November 2, 1925. Serial No. 66,152.

The object of my invention is to produce a single unit frequency converter capable of converting single phase currents of a given frequency into polyphase currents of a different frequency.

Figure 1:
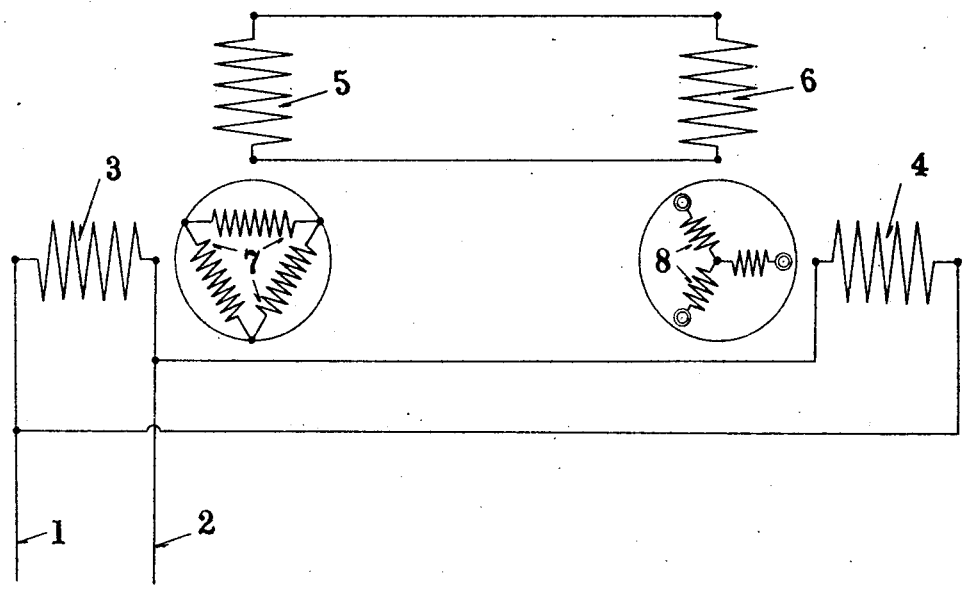
Figure 2:
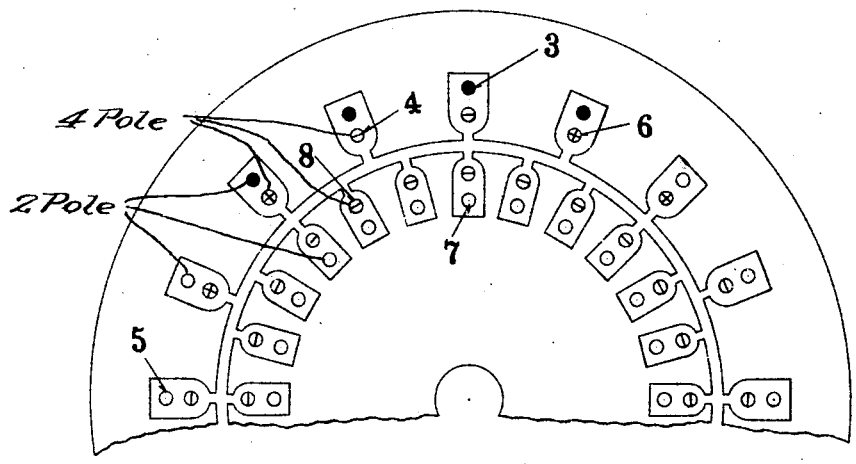

In the accompanying drawings, Figure 1 is a circuit diagram of the preferred form of my machine, and Figure 2 illustrates the disposition of the windings on the rotor and stator members.

The stator is provided with a two-pole inducing winding 3 and with a four-pole inducing winding 4, each connected to a common source of single phase supply through the mains 1 and 2. The reason for having windings 3 and 4 produce the number of poles designated is that they may be in non-inductive relation to each other, and it will be understood that any other combination of pole numbers may be used which are relatively noninductive.

The stator is also provided with a two-pole winding 5 displaced approximately 90 electrical degrees from the winding 3, and with a four-pole winding 6 displaced approximately 90 electrical degrees from winding 4, windings 5 and 6 being connected in circuit with each other.

The rotor is provided with a two-pole polyphase winding 7 which is short-circuited, and with a four-pole polyphase winding 8 connected to slip rings, which slip rings are in turn connected to the power line on which the currents, modified in phase and frequency, are to be impressed. In view of the pole numbers selected the rotor windings 7 and 8 are also noninductive with reference to each other. These windings may be wound for any suitable number of phases and are shown as three phase windings.

Referring to the operation of the machine described, the winding 3 cooperates with the rotor winding 7 to produce an induction motor torque, and a field produced by the currents in the winding 7 induces a voltage in the winding 5 displaced by 90 electrical degrees from the line voltage impressed on the winding 3. This voltage induced in winding 5 is impressed upon the winding 6 which is in inductive relation with the rotor winding 8 and this winding 6, together with the winding 4 connected to the single phase supply line, produces a rotating field cooperating with the winding 8. Assuming that the frequency of the single phase supply is 60 cycles the speed of the rotor will be 3,600 R. P. M., and if we so connect the windings 4 and 6 that the revolving field which they produce revolves in a direction opposed to the direction of revolution of the rotor the relative speed between armature conductors of the winding 8 and the rotating field will be 1,800 plus 3,600 or 5,400 R. P. M., and since the windings 8, 4 and 6 are four-pole windings an 180 cycle alternating current is generated in the winding 8. It will thus be seen that the particular machine just described converts a 60 cycle single phase alternating current into an 180 cycle polyphase current.

While in the single unit machine of the kind described, it is possible to obtain only certain ratios between the impressed and the delivered frequencies, the circuit arrangement which I have described can be applied to independent machines in which windings 3 and 5, and 7 are on the stator and rotor respectively of one machine, and windings 4 and 6, and 8 on the stator and rotor respectively of the other machine and by mechanically gearing the rotors together it is possible, by changing their speed relations, to produce any desired relation between the impressed and the delivered frequencies.

Having fully described my invention, what I claim as new and desire to secure by Letters Patent of the United States is:

An alternating current dynamo electric machine comprising a secondary member comprising a single magnetic structure provided with two induced windings having such relative number of poles as to be non-inductive with relation to each other, a primary member provided with two inducing windings having such relative number of poles as to be non-inductive with relation to each other, a source of single phase E. M. F., said inducing winding being connected to said source and each inductively cooperating with one only of the said induced windings, a third inducing winding on the primary member cooperating with the second induced winding and displaced from the other inducing winding which cooperates with said second winding, an induced winding on the primary member in inductive relation with the first induced winding on the secondary member and displaced from the inducing winding cooperating therewith, said induced winding on the primary member being in circuit with the third inducing winding, and means for deriving a ployphase E. M. F. from the second induced winding.

In testimony whereof, I hereunto affix my signature, this 27th day of October, 1925.

HANS WEICHSEL.